(12) United States Patent
Edwards

(10) Patent No.: US 12,692,019 B2
(45) Date of Patent: Jul. 28, 2026

(54) REFUELLING/DEFUELLING AN AIRCRAFT

(71) Applicant: Airbus Operations Limited, Filton (GB)

(72) Inventor: Henry Edwards, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 18/967,159

(22) Filed: Dec. 3, 2024

(65) Prior Publication Data

US 2025/0197025 A1 Jun. 19, 2025

(30) Foreign Application Priority Data

Dec. 13, 2023 (GB) ...................................... 2319057

(51) Int. Cl.
B64F 1/28 (2006.01)
(52) U.S. Cl.
CPC ..................................... B64F 1/28 (2013.01)
(58) Field of Classification Search
CPC ......................................................... B64F 1/28
USPC ......................................................... 141/103
See application file for complete search history.

(56) References Cited

U.S. PATENT DOCUMENTS

| | | | |
|---|---|---|---|
| 5,662,149 A | 9/1997 | Armellino | |
| 7,597,288 B2 | 10/2009 | Kwok et al. | |
| 9,404,446 B2 | 8/2016 | Fujiwara et al. | |
| 10,981,666 B1 | 4/2021 | Haberbusch et al. | |
| 12,011,989 B1 * | 6/2024 | Haberbusch ..... | B60K 15/03006 |
| 2004/0016240 A1 * | 1/2004 | Brook ..................... | F17C 13/10 62/52.1 |
| 2017/0341769 A1 * | 11/2017 | Haberbusch ............ | F17C 5/007 |
| 2023/0135912 A1 * | 5/2023 | Pedoussaut ............. | F16L 23/24 285/364 |

FOREIGN PATENT DOCUMENTS

| | | | |
|---|---|---|---|
| EP | 1852348 B1 | 11/2007 | |
| KR | 102115455 B1 * | 6/2020 | ................ F17C 5/06 |

OTHER PUBLICATIONS

KR 102115455 B1—English Translation (Year: 2020).*
NPL: Parker Product Catalog (Year: 2000).*
United Kingdom Search Report for corresponding United Kingdom Patent Application No. 2319057.2 dated Jun. 4, 2024.

* cited by examiner

*Primary Examiner* — Christopher M Afful
(74) *Attorney, Agent, or Firm* — Greer, Burns & Crain, Ltd.

(57) ABSTRACT

A fuel line, terminating in a refuel connector, is used to fuel/defuel an aircraft, for example with liquid hydrogen. A barrier is disposed around the area where the refuel connector connects to an aircraft fuel port, and is sealed against the aircraft wing with a seal. A gas line runs generally parallel to the aircraft fuel line, and supplies inert gas, for example nitrogen, into the volume defined by the barrier. The inert gas flushes out air present around the refuel connector such that the oxygen concentration in that area is significantly lowered. This prevents ignition of fuel in the event of a fuel leak from the fuel line structure.

17 Claims, 6 Drawing Sheets

360 — Retrieve fuel line structure for operation

362 — Begin supply of inert gas

364 — Deploy barrier

366 — Connect fuel line structure to aircraft

368 — Perform chill-down procedure

370 — Supply liquid hydrogen to aircraft

372 — Cease supply of liquid hydrogen to the aircraft

374 — Disconnect fuel line structure from aircraft

376 — Detach barrier

378 — Store fuel line structure

380 — Terminate supply of inert gas

REFUELLING/DEFUELLING AN AIRCRAFT

CROSS-REFERENCES TO RELATED APPLICATIONS

This application claims the benefit of Great Britain Patent Application Number 2319057.2 filed on Dec. 13, 2023, the entire disclosure of which is incorporated herein by way of reference.

FIELD OF THE INVENTION

The present disclosure relates to an apparatus and method for refuelling an aircraft (and/or defuelling an aircraft). More particularly, but not exclusively, this disclosure concerns an apparatus and method for protecting against ignition of vaporized hydrogen in the event of a hydrogen leak during a refuelling process for an aircraft that is configured to use hydrogen as a fuel.

BACKGROUND OF THE INVENTION

Hydrogen has been identified as a potentially environmentally preferable alternative to traditional fossil fuels, such as kerosene, in use as a fuel source for aircraft. Some aviation technologies and operations may require relatively minor adjustments to utilize hydrogen, whereas some will require significant alterations. The fuel supply and storage system is one of the latter, due to the considerably different requirements and characteristics of hydrogen in comparison to traditional jet fuels.

Traditional kerosene refuelling technology is not suitable for hydrogen refuelling for a variety of reasons. At atmospheric pressure, hydrogen must be stored at temperatures of 20K or less to be stored as a liquid. A kerosene fuel line does not have sufficient insulation to carry liquid hydrogen at this temperature, and the materials used in such a kerosene fuel line might not be able to withstand such low temperatures.

Additionally, hydrogen is a highly flammable substance, with an ignition energy (that being the energy required to cause a substance to ignite) significantly lower than kerosene. Hydrogen has a large range of concentrations in atmospheric air for which ignition can occur. Hydrogen leaks occurring during refuelling may be difficult to eliminate entirely. Current safety measures in place for preventing ignition of kerosene during a refuelling process are likely to be inadequate for preventing ignition of hydrogen.

The moment of connection of the fuel supply to the aircraft fuel port has been identified as a period of particularly high ignition risk. This is because the fuel line is not connected to the aircraft, so hydrogen vapors which may be present from a previous operation could leak out, and a potential static charge between the aircraft and refuelling equipment could be sufficient to cause ignition.

Additionally, the industry standard process for aircraft refuelling is an under-wing connection by the fuel supply. Therefore, any hydrogen vapors which leak out may not immediately disperse, but could collect in significant concentrations under the wing. Ignition of hydrogen during a refuelling process could therefore cause both injury to people handling the equipment, and damage to the aircraft and surrounding equipment.

In the case of hydrogen powered aircraft, it is likely that hydrogen will need to be defueled from the aircraft, that is retrieving hydrogen from the aircraft, for example for storage in fuel storage facilities off the aircraft if the aircraft is not operating and not likely to be needed for operation for several hours at least.

The present invention seeks to mitigate one or more of the above-mentioned problems. Alternatively or additionally, the present invention seeks to provide an improved apparatus and method of refuelling an aircraft, that can for example be used to refuel an aircraft with liquid hydrogen whilst mitigating the risk of said hydrogen igniting in the event of a leak.

SUMMARY OF THE INVENTION

The present invention provides, according to a first aspect, an ignition protection system for a ground-based refuelling (or defuelling) system for an aircraft. The refuelling system comprises a fuel line which terminates in a refuel connector. The ignition protection system also comprises a structure which is configurable to provide a barrier around the refuel connector. The ignition protection system also comprises a gas line configured to supply inert gas into a volume between the barrier and the refuel connector. Embodiments of the invention may therefore be configured to protect against ignition in the event of a fuel leak from the refuelling system. For example, in use, when fuel is supplied by the fuel line to an aircraft fuel tank, possibly via pipework within the aircraft (the fuel line being connected via the refuel connector to the aircraft on the ground), the structure is configured to provide a barrier around the refuel connector and inert gas is pumped through the gas line into the inside of the barrier, creating and maintaining an oxygen-scarce inert region around the refuel connector, thus preventing ignition of any leaked fuel.

It will be appreciated that similar apparatus to the above-mentioned ignition protection system and ground-based refuelling system could be used when performing a defueling process—i.e., when fuel flows from the aircraft via the fuel line, for example to ground support equipment/a fuel reservoir off the aircraft, as opposed to when fuel is supplied to the aircraft. As such the terms 'refuel connector', 'refuelling system' are to be understood as encompassing the defuelling use case—i.e., as if the word 'refuel' (and/or 'refuelling') is replaced with the word 'defuel' (and/or 'defuelling'), insofar as that makes sense in the context (with any other changes to other words as may be required).

The structure configurable to provide the barrier may have a maximum dimension that is less than 120 cm, for example no more than 60 cm, such that for example it may easily be carried with the fuel line/refuel connector when being used. The structure may be integrated with, or configured to be integrated with, the refuel connector and/or the fuel line. The barrier may, in use, have a diameter (or width) which is no more than 100 cm for example. The barrier, in use, may be no more than 1 m in length (defined along the axis parallel to the axis of the fuel line). The barrier is preferably so shaped and sized to be large enough to allow a human operator to access the refuel connector manually, with the barrier in situ, but small enough that the volume of inert gas within the barrier is at a manageable level (for example much less than a cubic meter, preferably less than 0.3 m³).

As mentioned above, the fuel line terminates at one end at a refuel connector. The refuel connector may have at least one layer of insulation. The refuel connector may have a plurality of internal layers. This may make the refuel connector suitable for supplying cryogenic fluids both to and from the aircraft. The other end of the fuel line may be connected, or otherwise be in fluid communication with, a supply of fuel. The supply of fuel may be accommodated in ground support equipment. The fuel line may be tubular. The fuel line may be flexible, for example via one or more joints, to increase ease of use. The fuel line may be insulated using vacuum-insulation. Such vacuum insulation may for example take the form where a near-vacuum is created between the surface of the item being insulated, and a second surface disposed a distance from the first surface. This significantly reduces heat transfer by convection and conduction. The fuel line may be a part of a fuel line structure, that may for example include other parts or apparatus associated with the fuel line (e.g. an insulating layer). For example, the combination of the fuel line, refuel connector, and vacuum insulation, may be considered as a fuel line structure. The refuel connector may be configured to connect to an aircraft fuel port. The aircraft fuel port may be on the underside of the aircraft wing. The aircraft fuel port may be located elsewhere on the aircraft, for example on the engine nacelles and/or the fuselage. In use, the gas line supplies inert gas into the volume between the barrier and the refuel connector. As such, the gas line may be connected (optionally releasably connected) at one end, or otherwise in fluid communication with, a supply of inert gas. The gas line may be tubular. The gas line may be flexible to increase ease of use. The supply of inert gas may be located on ground support equipment. It may be preferable to have the supply of inert gas and the supply of fuel located on the same ground support equipment. The supply of inert gas may contain nitrogen, for example at least 90% nitrogen, for example at least 99% nitrogen by volume.

The gas line may furcate (e.g. split into two or more furcated gas lines). The gas line may furcate into at least five furcated gas lines, for example at least ten furcated gas lines. The gas line may furcate more than once, for example the gas line may furcate at least twice (e.g., splitting into two or more lines which then each split into two or more further lines). Each furcated gas line may terminate in a respective gas line outlet. The gas line outlets may each be in the form of a nozzle. The gas line may furcate at least halfway along the gas line between the inert gas supply and the gas line outlets (i.e., closer to the outlets than the supply), for example at least 75% of the way along the gas line between the inert gas supply and the gas line outlets, for example at least 90% of the way along the gas line between the inert gas supply and the gas line outlets.

In certain embodiments, the gas line may be in fluid communication with a gas compartment (for example a manifold), which may comprise several outlets. It may be that the gas line is flexible, whereas the gas compartment is a more rigid structure.

The gas line may be disposed adjacent to the fuel line structure. Alternatively or additionally, the gas line may be integrated at least partially with the fuel line structure (for example being fixedly attached to an outer part of the fuel line structure or housed within the fuel line structure). For example, the gas line may furcate within the fuel line structure. It may be that the fuel line structure comprises outlets each associated with a gas line outlet (and not being in fluid communication with the fuel supply). Integrating the supply of inert gas with the supply of fuel may enable one structure to house both the fuel line and the inert gas line in a beneficial manner. The gas line may be fully integrated within the fuel line structure, such that one structure houses both the fuel line and the entirety of the gas line. This may protect the gas line from damage.

The structure configurable to provide a barrier may be configurable between an "in-use" configuration in which the barrier at least partly defines the volume into which the inert gas can be supplied and a stowed configuration (in which for example, the barrier is no longer formed, or is collapsed, or takes on a different shape—more suitable for stowage). The barrier may be attachable to, and detachable from, the fuel line (e.g., releasably attachable). The barrier may comprise an inflatable portion, for example one that inflates to be deployed and deflates to be stowed.

The structure (that provides the barrier in use) may be connected to the fuel line structure. The structure may comprise a rigid frame, which in use supports material for forming the barrier. The rigid frame may comprise spokes, which in use are connected to the fuel line structure, for example being connected or connectable to the refuel connector. The spokes may extend radially, for example outwardly from a central hub, in a direction which is substantially perpendicular to the axis of the fuel line and/or the refuel connector (the axis being the longitudinal axis in either case). There may be at least two spokes, for example at least three spokes. Each spoke may connect to a barrier support structure. The barrier support structure(s) may be configured to support a barrier which extends circumferentially around, and spaced apart from, the fuel line. In the case where there are multiple barrier support structures, they may be distributed in spaced apart positions so that in use they are spaced apart circumferentially around the fuel line. It may be that a single barrier support structure extends circumferentially around the fuel line when in use. The barrier support structure may be a rigid structure. Such a rigid structure may, for example, help with making the barrier sufficiently strong structurally when deployed. It may be that the barrier support structure is fixed in position relative to the fuel line structure. The barrier support structure may provide fittings for a barrier. A barrier may be connected to the fittings. Alternatively or additionally, the barrier may be integrated with the barrier support structure.

The structure (for the barrier) may comprise a seal, which for example in use when the refuel connector is connected to the aircraft, seals a space between the barrier and the aircraft. The seal may be a part of the barrier support structure. The seal and barrier may work in conjunction to control the flow of gas into/out from the volume between the barrier and the refuel connector.

It may be that the structure is configurable to provide a barrier around both the refuel connector and a section of the fuel line, for example a section being at least 10 cm long. The structure may provide a barrier around both the refuel connector and/or a section of the fuel line, when not connected to the aircraft and/or when not in use for refuelling. For example, the barrier may be provided by a structure that neither is collapsed nor otherwise needs to be reconfigured when the fuel line is not being used in a refuelling operation. The barrier may provide a level of protection for the refuel connector and fuel port against adverse weather conditions, for example rain.

The gas line may comprise one or more outlets within the volume defined by the barrier—i.e., such that the barrier is disposed around those gas line outlets in use. For example, in the case where the gas line is integrated at least partly with the refuel connector, the gas line outlets may inevitably be disposed within the barrier, when refuelling. Having the barrier being disposed around the gas line outlets may provide a more effective mixing of gas within the barrier and/or more effective flushing out of atmospheric air and/or leaked fuel vapor with the inert gas.

The barrier may have a first end and a second end opposite the first end. The ends may be spaced apart from each other along an axis parallel to the axis of the fuel line. The first end may be referred to as a "near end", which is closer to the ground support equipment measured along the axis of the fuel line. The other (second) end may be referred to as a "far end". The far end may in use be directly adjacent to, in contact with and/or in sealing engagement with, a surface of the aircraft. The barrier may be open at the near end (and optionally closed at the far end for example in such a way as to be against the surface of the aircraft, leaving very little if any free volume in which leaked fuel could collect between the barrier and the adjacent aircraft structure. In such a case, the far end may have a sealed opening to permit passage of the refuel connector. Also in such a case, the volume into which inert gas is supplied in use may thus be open to atmosphere at the near end. This may then require the inert gas to be supplied at a rate high enough to constantly flush the volume with inert gas and discourage the presence of atmospheric air in the volume as a result of the through-flow of inert gas. The barrier may be open at both ends, for example sealing against the aircraft surface at the far end. In such a case, the inert gas may be supplied at a rate high enough to constantly flush the volume protected by the barrier with inert gas, as mentioned above. The barrier may be closed at the near end (and optionally open at the far end, for example being sealed against the aircraft). In such a case, the near end may have a sealed opening to permit passage of the refuel connector and/or the gas line. Also in such a case, in use, the volume defined by the barrier may be enclosed on all sides, with little or substantially no possibility of leakage of gas into the volume from atmosphere. In use, the volume may be supplied with an over-pressure of inert gas (the barrier being engineered to allow non-negligible, but nevertheless relatively low, flow of gas from the volume to atmosphere, for example by leakage and/or a seal bypass) so that atmospheric oxygen is restricted/prevented from entering the volume during refu-elling. One or both of the ends may be shaped so that the end substantially coincides with a plane.

The barrier may have rotational symmetry about an axis that may be parallel (e.g. in line with) the fuel line axis in use. The barrier may be in the shape of a cylinder. The barrier may be in the shape of a dome. The base of the dome may be in contact with the aircraft via a seal. The seal may be made of a flexible material. This may assist the seal in conforming to the shape of the aircraft, for example a curved or discontinuous surface, for example over a panel gap of the aircraft.

The barrier may be made of a flexible material. This may reduce the weight of the barrier and/or allow the barrier to be moved between an "in-use" configuration and a stowed configuration and/or aid removal of the barrier.

According to a second aspect of the invention there is provided a method for fueling/defuelling an aircraft with liquid hydrogen. The method comprises a step of supplying hydrogen to/retrieving hydrogen from an aircraft on the ground via a fuel line that is for example connected to the aircraft via a connection (provided for that purpose, for example by a refuel connector configured to interface with an aircraft fuel port) at the aircraft. The method comprises the steps of disposing a barrier, for example around the connection, and supplying inert gas into a volume defined at least in part by the barrier (for example a region between the barrier and the connection) to protect against ignition of hydrogen gas. The step of supplying hydrogen is preferably commenced only after both the barrier is around the connection and the inert gas has started to be supplied.

The step of supplying inert gas creates an oxygen-scarce inert zone, such that for example were hydrogen to leak when refuelling (for example from the refuel connector), it would not be able to ignite. For example, the oxygen content immediately around the refuel connector may be less than 4%, for example less than 1% by volume. The method may be performed with the use of the apparatus of the first aspect of the invention. The hydrogen may be supplied at a temperature below 50K. The hydrogen may be supplied at a pressure greater than 1 bar. The inert gas may be supplied at a temperature T1. T1 may be ambient temperature. The inert gas may be supplied at a pressure P1. P1 may be less than 10 bar, for example less than 5 bar. The inert gas may be nitrogen, for example at least 90% nitrogen, for example at least 99% nitrogen, by volume. The inert gas could comprise nitrogen, carbon dioxide, or a noble gas.

The step of disposing the barrier around the connection may further comprise moving the barrier from a stowed configuration, for example by unfolding the barrier. The step may comprise attaching (e.g., with fixings) the barrier to the fuel line and/or to a refuel connector or the like. The barrier may already be attached to the fuel line.

The method may comprise a step of retrieving the fuel line structure for operation. The retrieval may be manual. The fuel line structure may be located on ground support equipment.

The method may further comprise supplying inert gas automatically, and preferably before hydrogen fuel is sup-plied to the aircraft. For example, the method may comprise supplying inert gas automatically upon retrieval of the refuel connector (or other movement of the fuel line or associated structure that would be required before fuel can be supplied to the aircraft). For example, the fuel line structure may depress a switch such that, upon retrieval or deployment of at least part of the fuel line structure, is released, beginning the supply of inert gas. It may be that there is a time delay between retrieving the fuel line or associated structure and beginning the supply of inert gas, with the time delay being less than 10 seconds, for example less than 5 seconds, for example less than 2 seconds. It may be that fuel cannot be supplied until after inert gas is being supplied, for example only after a certain period of time which may be at least 2 seconds, for example at least 5 seconds. It may be that a switch, sensor or other device is activated/deactivated when inert gas is supplied, and fuel is prevented from being supplied (for example with an additional time delay) until after such activation/deactivation has happened or the sup-ply of inert gas is otherwise deemed to have commenced.

A control system may be provided which controls the flow of inert gas and/or the flow of liquid hydrogen. The control system may ensure that the flow of liquid hydrogen is not started until after sufficient inert gas has been supplied and/or until a certain time after the start of supplying of inert gas.

An embodiment of the invention may be in the form of a ground-based refuelling system for a hydrogen powered aircraft. Such a system may comprise a fuel line for sup-plying cryogenic hydrogen to the aircraft. There may be a barrier, for example to assist in protecting against inadver-tent ignition of leaked hydrogen when refuelling. The barrier may for example be configured to keep atmospheric oxygen away from a region, for example a region at which the fuel line attaches to the aircraft. There may be a supply of inert gas. In use, inert gas may be supplied to said region, which may for example assist in protecting against inadvertent ignition of leaked hydrogen when refuelling.

The method may comprise connecting the fuel line structure to the aircraft. This may comprise pushing a refuel connector onto an aircraft fuel port and optionally then locking the refuel connector onto the aircraft fuel port. This may comprise twisting the refuel connector, or a part thereof, about its longitudinal axis. This may lock the refuel connector in place on the aircraft fuel port. This step may additionally comprise depressing a valve. This may establish fluid communication between the refuel connector and the aircraft fuel port.

The method may comprise performing a chill-down process on the fuel line, for example to lower the temperature of the fuel line and/or parts of the aircraft receiving fuel (e.g., pipework, fuel tanks and the like). This chill-down process may occur before liquid hydrogen is supplied as fuel.

The method may further comprise the step of supplying liquid hydrogen through the fuel line to the aircraft as fuel. This step may be performed until the aircraft has the desired quantity of fuel for the specific situation. The liquid hydrogen may be supplied at a temperature T2. T2 may be significantly less than T1. T2 may be less than 50K, for example less than 30K. The liquid hydrogen may be supplied at a pressure P2. P2 may be greater than P1. P2 may be greater than 1 bar, for example greater than 3 bar, for example greater than 6 bar. In the defuelling case, this step may be the step of retrieving liquid hydrogen from the aircraft. This step may be performed until the aircraft has the desired quantity of fuel for the specific situation.

The method may further comprise the step of ceasing the supply of liquid hydrogen to the aircraft. In the defuelling case, this step may comprise ceasing the retrieval of liquid hydrogen from the aircraft.

The method may further comprise a step of disconnecting the fuel line structure from the aircraft. This may involve the inverse of the step of attaching the fuel line structure to the aircraft. This may involve lifting a valve. This may terminate fluid communication between the refuel connector and the aircraft fuel port. This step may further involve twisting the refuel connector, or a part thereof, along its axis. This may unlock the refuel connector from the aircraft fuel port. The direction of twist may be opposite in direction to the step of attaching the refuel connector. The step may further involve pulling the refuel connector from the aircraft fuel port. This step may allow the refuel connector to be moved freely relative to the aircraft.

The method may further comprise a step of detaching the barrier. The barrier may be folded up after removal. The barrier may be stored compactly. The barrier may take up a smaller volume when stored in comparison to when deployed.

The method may further comprise the step of storing the fuel line and its associated structure, for example on ground support equipment. The storage of the fuel line structure may be done manually. The method may further comprise a step of terminating the supply of inert gas. This step may be performed manually. Alternatively, this step may be performed automatically, for example after (with an optional time delay of at least 2 seconds, for example at least 10 seconds) hydrogen has stopped being supplied, after the fuel line structure has been disconnected from the aircraft or after the fuel line structure has been stored.

It may be that the steps are carried out in an order different from the order in which they are set out above.

A similar invention to that described and claimed herein is described and claimed in UK patent application entitled "AIRCRAFT REFUELLING/DEFUELLING SYSTEM"

with agent's reference "P038509GB", having the same filing date as the present application. The contents of that application are fully incorporated herein by reference.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Embodiments of the present invention relate to an ignition protection system for a ground-based refuelling system for an aircraft, in particular when refuelling an aircraft with liquid hydrogen. In use of the embodiments, inert gas is supplied to a region defined by a barrier formed locally around the refuel connector. The supply of inert gas to this region reduces the risk of ignition of hydrogen gas when refuelling.

Figure 1:
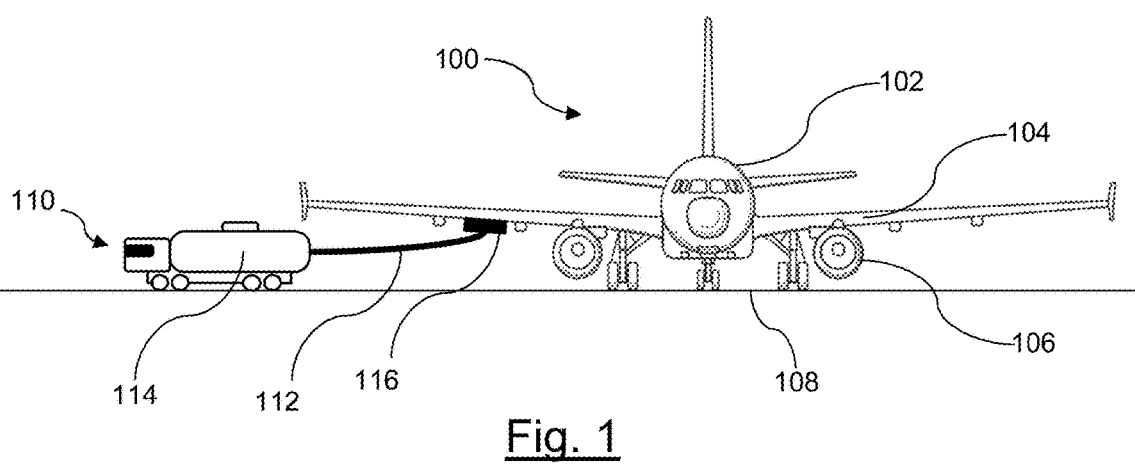
FIG. 1 shows a front view of an aircraft being refueled by ground support equipment according to a first embodiment of the invention.

FIG. 1 shows a hydrogen-powered aircraft 100 comprising a fuselage 102, wings 104, and engines 106, located on the ground 108, being re-fueled by ground support equipment 110 via a fuel line 112. The ground support equipment 110 carries a source 114 of liquid hydrogen fuel (stored cryogenically) and connects to the aircraft via a refuel connector 116. This refuel connector 116 is configured to connect and lock to an aircraft fuel port (not shown), located on the underside of the aircraft wing 104. The ground support equipment 110 also carries a supply of inert gas (not shown). The fuel is supplied to a tank system in the aircraft, the tanks of which may be housed in the wings 104 and/or in the fuselage 102 for example.

Figure 2:
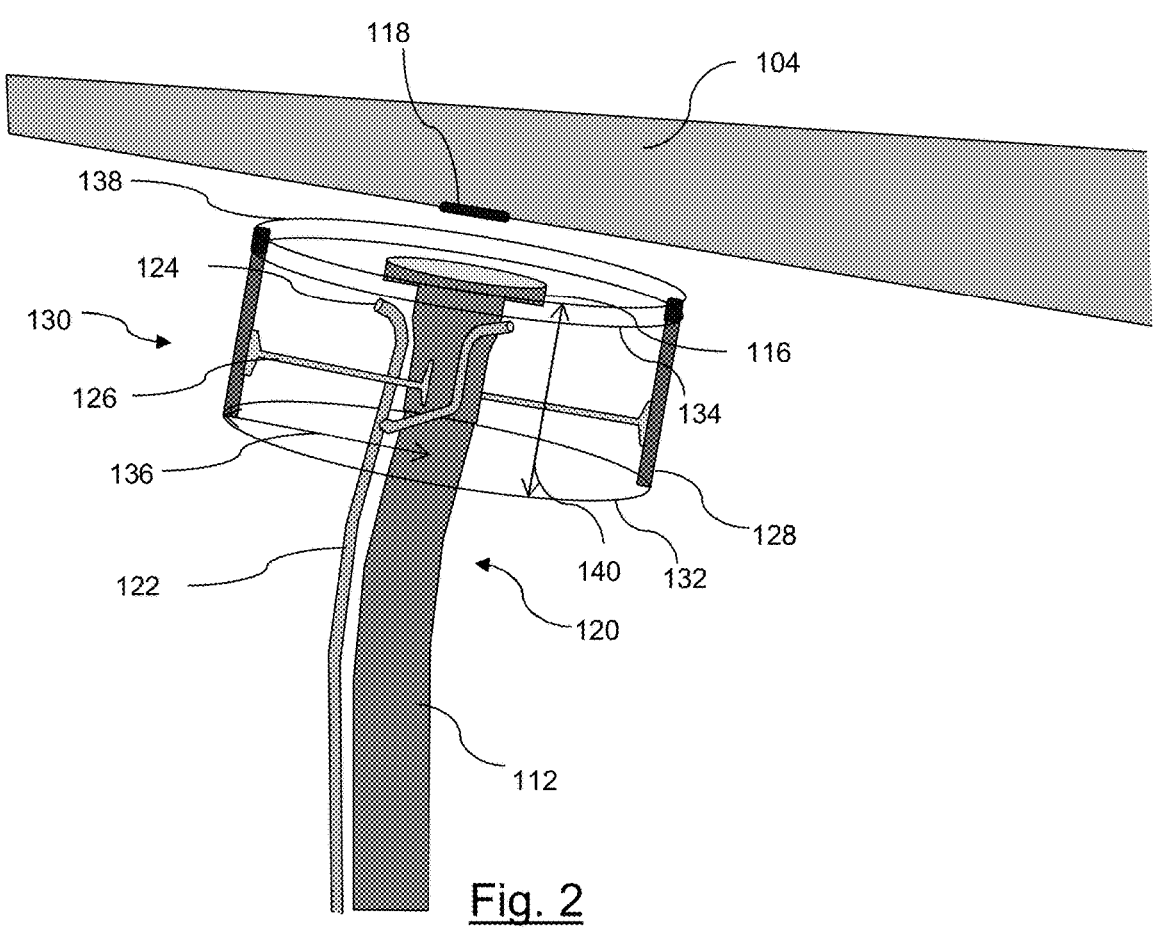
FIG. 2 shows a refuel ignition protection apparatus immediately before connection to the aircraft of the first embodiment.

FIG. 2 shows a schematic view of the refuel system immediately prior to connection to the aircraft fuel port 118 underneath the aircraft wing 104 according to an embodiment of the present invention. In other embodiments of the invention, the fuel port 118 may be located elsewhere on the aircraft, for example on the fuselage. The refuel system comprises a fuel line 112 arranged to supply liquid hydrogen, said fuel line terminating in a refuel connector 116. The fuel line is a rigid tube with flexible joints. The fuel line is insulated with vacuum insulation (not visible). The combination of the fuel line 112, vacuum insulation, and refuel connector 116, may be considered as being part of a fuel line structure 120, which may additionally include ancillary components.

Adjacent to the fuel line 112 is a gas line 122 which runs generally parallel to the fuel line along their axes. In the present embodiment, the gas line 122 is a flexible tube. This gas line 122 supplies inert gas, in this case nitrogen having a purity of greater than 99% by volume. Proximate to the refuel connector 116, the gas line 122 bifurcates into two gas lines. Each bifurcated gas line terminates in a respective gas line outlet 124. In another embodiment, the gas line may furcate into more than two gas lines, and/or furcate more than once, each line terminating in a respective gas line outlet 124, for example.

Two spokes 126 extend from the refuel connector 116. The spokes are connected to the refuel connector 116 by a suitable fixing (not shown) such as a hub which is clamped onto the refuel connector 116. The spokes 126 are rigid. Each spoke 126 extends radially out from the fuel line (that is, in a direction that is substantially perpendicular to the direction of the axis of local portion of the fuel line). Each spoke is connected to a barrier support member 128. The barrier support members 128 are rigid. Each barrier support member 128 is disposed generally parallel with the axis of the refuel connector 116, and generally perpendicular to the spoke to which it is attached. The barrier support members and the spokes 126 may collectively be considered as defining a barrier support structure 130.

The barrier support structure 130 supports a cylindrical barrier (that resembles the form of a veil), the outline of which is represented by lines 132 and 134. In the present embodiment, the barrier material is flexible and the barrier is open at both ends. In order to support the flexible barrier, the barrier support structure may further comprise additional circular rings (not shown) arranged along the longitudinal axis of the barrier to act as a skeletal support structure. The cylindrical barrier is detachably connected to the support structure 130 by suitable fixings (not shown). The radius of the cross section of the cylindrical barrier (being half its diameter, when in use), indicated by double-headed arrow 136, is about 50 cm. In the present embodiment, the circular cross section of the cylindrical barrier and the circular cross section of the fuel line 112 are substantially concentric. The barrier support structure 130 and the barrier are fixed in place relative to the fuel line.

An annular seal, the outline of which is defined by lines 134 and 138, is connected to the top of the barrier support structure 130 (i.e., at the far end of the cylindrical barrier), so that the bottom face of the seal and the upper face of the barrier are flush.

The barrier (including seal) is about 40 cm in length in the present embodiment (its length being along its axis and perpendicular to the diameter), indicated by double headed arrow 140. In use, when the seal is engaged with the surface of the aircraft wing 104 around the fuel port 118 the barrier encloses the refuel connector 116 radially on all sides (i.e., extends 360 degrees around the connector, when viewed in the axial direction). The gas line outlets 124 are located within the interior volume defined by the barrier.

Figure 3:
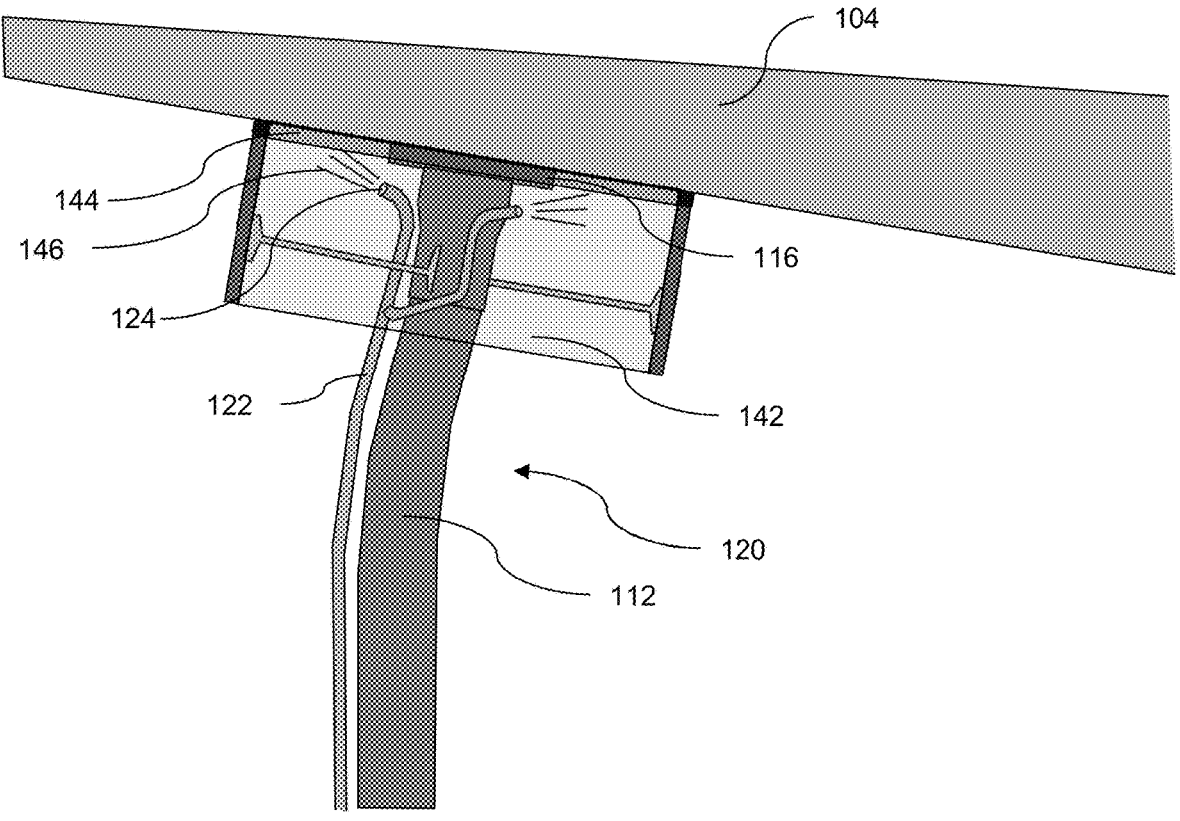
FIG. 3 shows the refuel ignition protection apparatus of the first embodiment after connection to the aircraft of the first embodiment.

FIG. 3 shows the embodiment of the invention in FIG. 2 in use. For clarity, the barrier 142 and seal 144 have been included in FIG. 3, but are represented as transparent so as not to obscure other parts of the apparatus. The refuel connector 116 is connected to the aircraft fuel port (obscured due to connection with the refuel connector). This allows for fuel, in this embodiment liquid hydrogen, to be supplied through the fuel line 112 into the aircraft fuel tanks (not pictured). The hydrogen is supplied at a temperature of around 20K, and at pressures of between 1 and 10 bar.

The cylindrical barrier 142 of this embodiment is open at the end nearest to the ground support equipment and is also open at its far end, which in use is pressed against the aircraft wing 104, via the annular seal 144. When so positioned, the annular seal 144 is flush with the surface of the aircraft wing 104 such that the volume defined by the annular seal 144 and cylindrical barrier 142 is bounded at its top by the aircraft wing surface and the refuel connector 116. In this way, the seal seals the space between the barrier and the aircraft wing surface. This prevents and/or reduces egress of gas out the top of the cylinder volume defined by the cylindrical barrier and annular seal, and moreover ingress of atmospheric air into the volume from the region directly adjacent to the aircraft wing surface and outside the cylindrical barrier.

The use of the cylindrical barrier 142 and the supply of inert gas of this embodiment is used to protect against ignition (i.e., significantly reduce the risk of ignition compared to the case of not employing such a system) in the event of a hydrogen fuel leak from the fuel line structure 120 during a refuelling operation.

In use, Nitrogen is supplied through the inert gas line 122 and exits through the inert gas line outlets 124. In the present embodiment, the nitrogen is supplied at ambient temperature. The nitrogen is also supplied at atmospheric pressure. The nitrogen, represented by lines 146, exits the inert gas line outlets into the volume enclosed by the cylindrical barrier 142, annular seal 144, surface of the aircraft wing 104, and refuel connector 116. The effect of supplying the nitrogen is explained below with reference to FIGS. 4 and 5.

Figure 4:
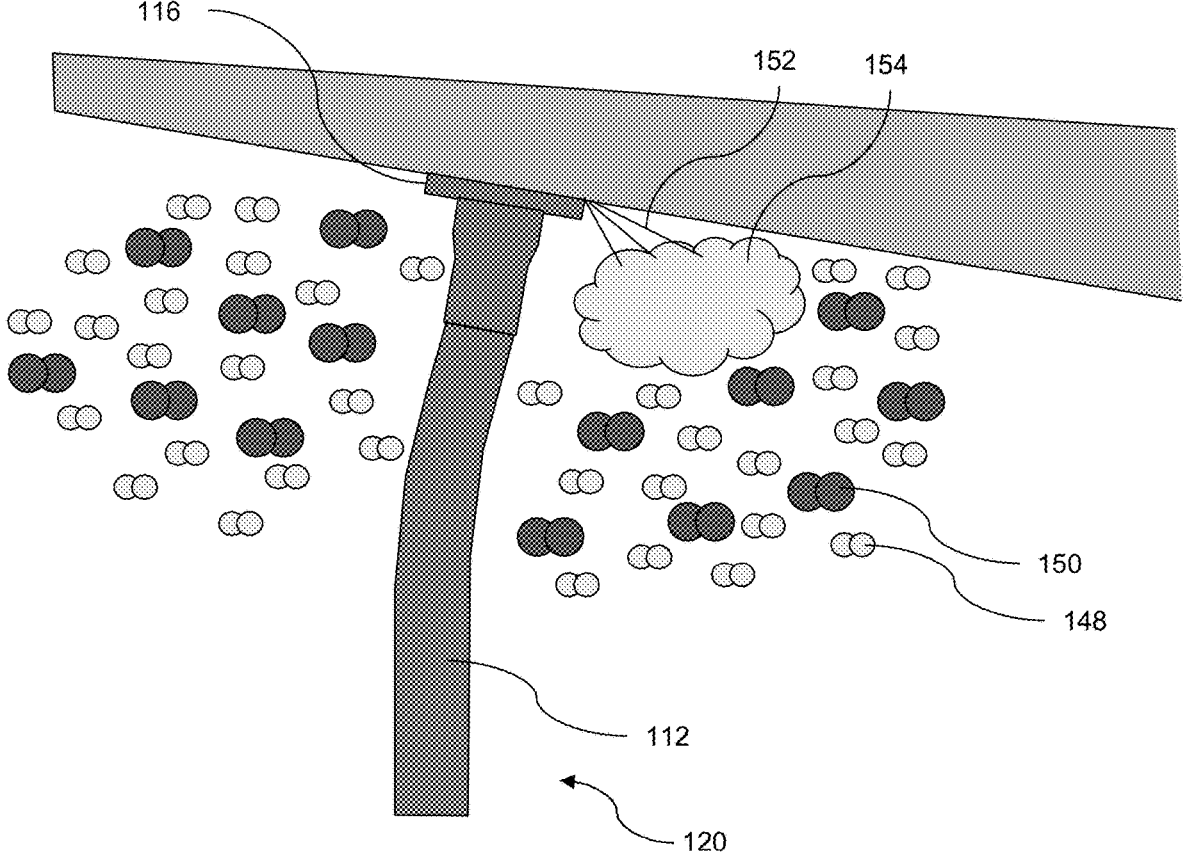
FIG. 4 shows schematically a potential risk case during a refuelling process without implementation of the present invention.

FIG. 4 displays a refuelling system without using the cylindrical barrier and inert gas system of the present embodiment. There is a fuel line 112 terminating in a refuel connector 116. The refuel connector is connected to the aircraft fuel port (not visible). In this example, the fuel line supplies liquid hydrogen to the aircraft. The aircraft and the fuel line are surrounded by air. This will predominantly contain nitrogen and oxygen. Nitrogen molecules are represented by the lighter-shaded smaller-sized pairs of circles 148, and oxygen molecules are represented by the darker-shaded larger-sized pairs of circles 150. FIG. 4 displays a potential hazardous situation in which gaseous hydrogen leaks from the fuel line structure 120 into the surrounding air, represented by lines 152 and vapor cloud 154. Due to the low boiling point of hydrogen, any leaked liquid hydrogen will rapidly vaporize when not insulated within the fuel line. This could lead to concentrated hydrogen vapor 154 being present among oxygen 150, which poses an ignition risk.

Figure 5:
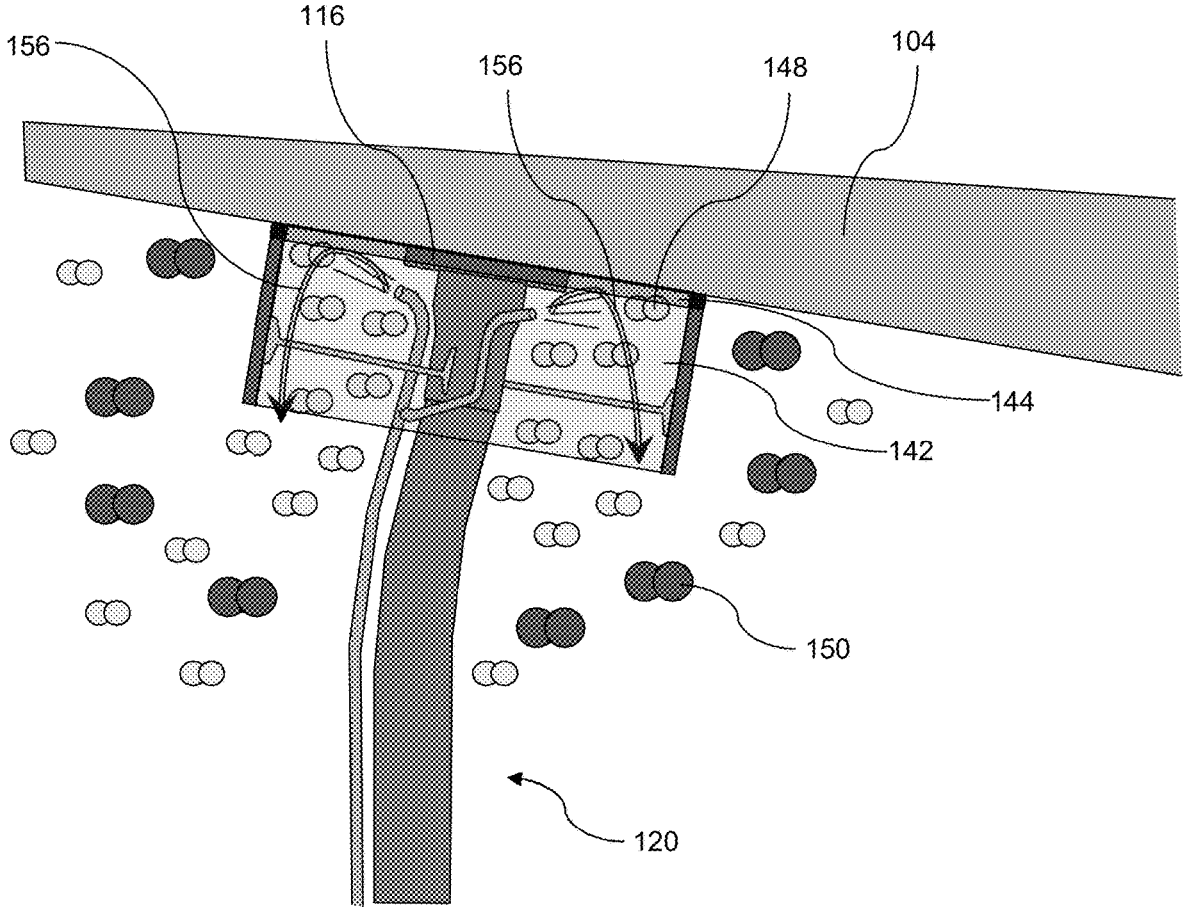
FIG. 5 shows schematically the effect of the present invention on the risk case of FIG. 4.

FIG. 5 displays the air composition around the refuelling system when using the present embodiment. In this embodiment, the inert gas supplied is nitrogen 148. The constant supply of nitrogen 148 into the enclosed volume defined by the cylindrical barrier 142, annular seal 144, surface of the aircraft wing 104, and refuel connector 116, causes gas previously present in said volume to be flushed out and to be replaced with nitrogen. The gas in the volume will follow a path such as those shown by arrows 156. This will mean that the refuel connector, which poses the risk of leaking hydrogen, is constantly surrounded by an abnormally high concentration of inert gas in comparison to regular air. Therefore, the concentration of oxygen molecules 150 in the volume will be significantly lower than that of regular air. Chiefly, the oxygen concentration is lower than 1% by volume. Therefore, should a hydrogen leak occur in this situation, the concentrated hydrogen vapor will not be able to ignite due to the low oxygen concentration. Through the same process, any leaked hydrogen vapor will be sufficiently dispersed by the inert gas supply such that upon leaving the volume it will not be sufficiently concentrated to ignite. Further, the flushing effect moves any leaked hydrogen away from the aircraft surface, which provides the highest ignition risk due to static charge.

Figure 6:
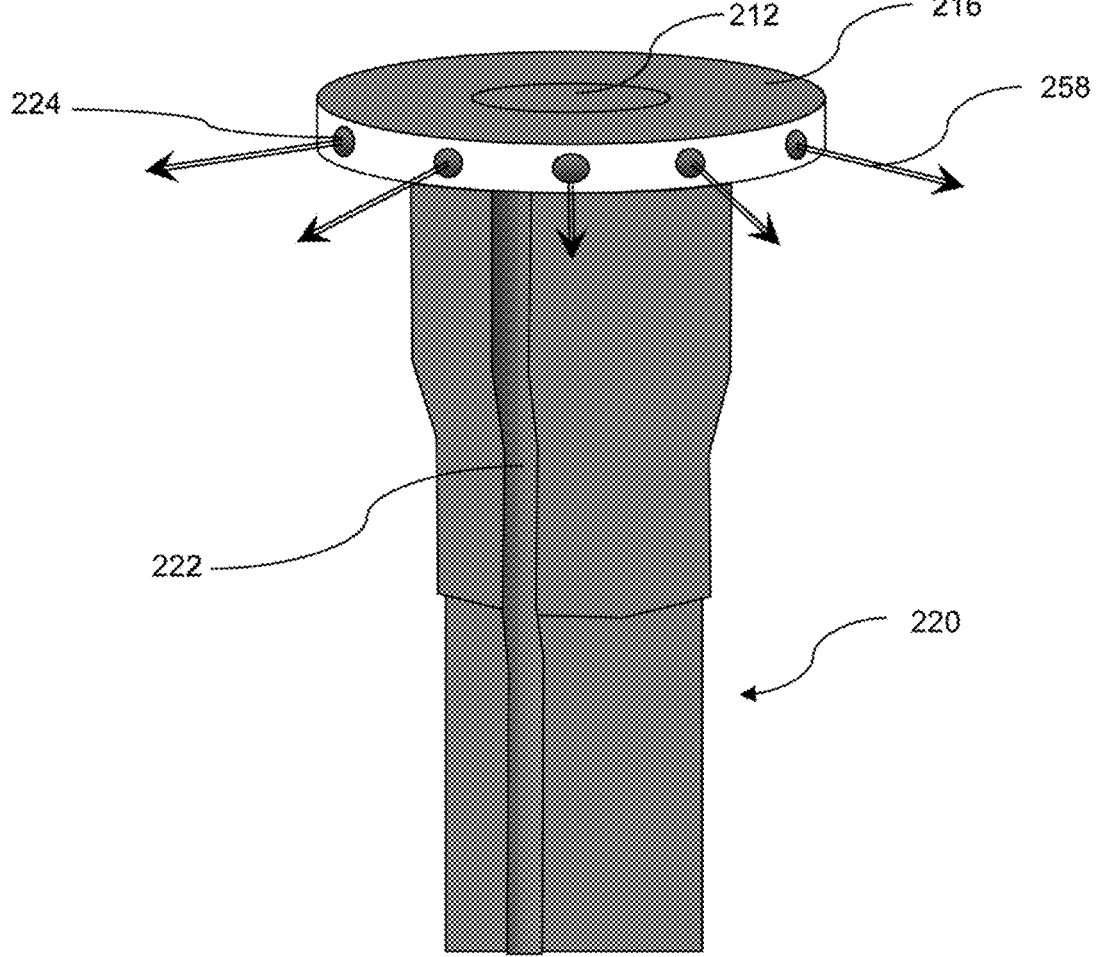
FIG. 6 shows a partially integrated refuel line, gas line, and plurality of gas line outlets according to a second embodiment of the invention.

FIG. 6 shows an alternative arrangement of the gas line 222 and gas line outlets 224 in relation to the fuel line structure 220 according to a second embodiment of the present invention. The other elements of the embodiment as displayed in FIG. 2 are still present, but are omitted from FIG. 6 for clarity. FIG. 6 shows a fuel line structure 220 terminating in a refuel connector 216. Housed within the fuel line structure 220 is a fuel line 212. Vacuum insulation (not shown) is present within the fuel line structure 220, to thermally insulate the fuel line 212. A gas line 222 is partially integrated into the fuel line structure 220 such that the gas line 222 is attached to the fuel line structure, and runs parallel to the fuel line structure and refuel connector 216. In alternative embodiments, the gas line may be fully integrated into the fuel line structure. The gas line then passes inside the fuel line structure proximate to the refuel connector 216. Within the fuel line structure, the gas line furcates into a plurality of gas lines, each associated with a gas line outlet 224. Each gas line outlet 224 is arranged circumferentially around the outer surface of the refuel connector. Therefore, even dispersal of the inert gas is achieved. Inert gas exiting the gas line outlets is represented by arrows 258.

Figure 7:
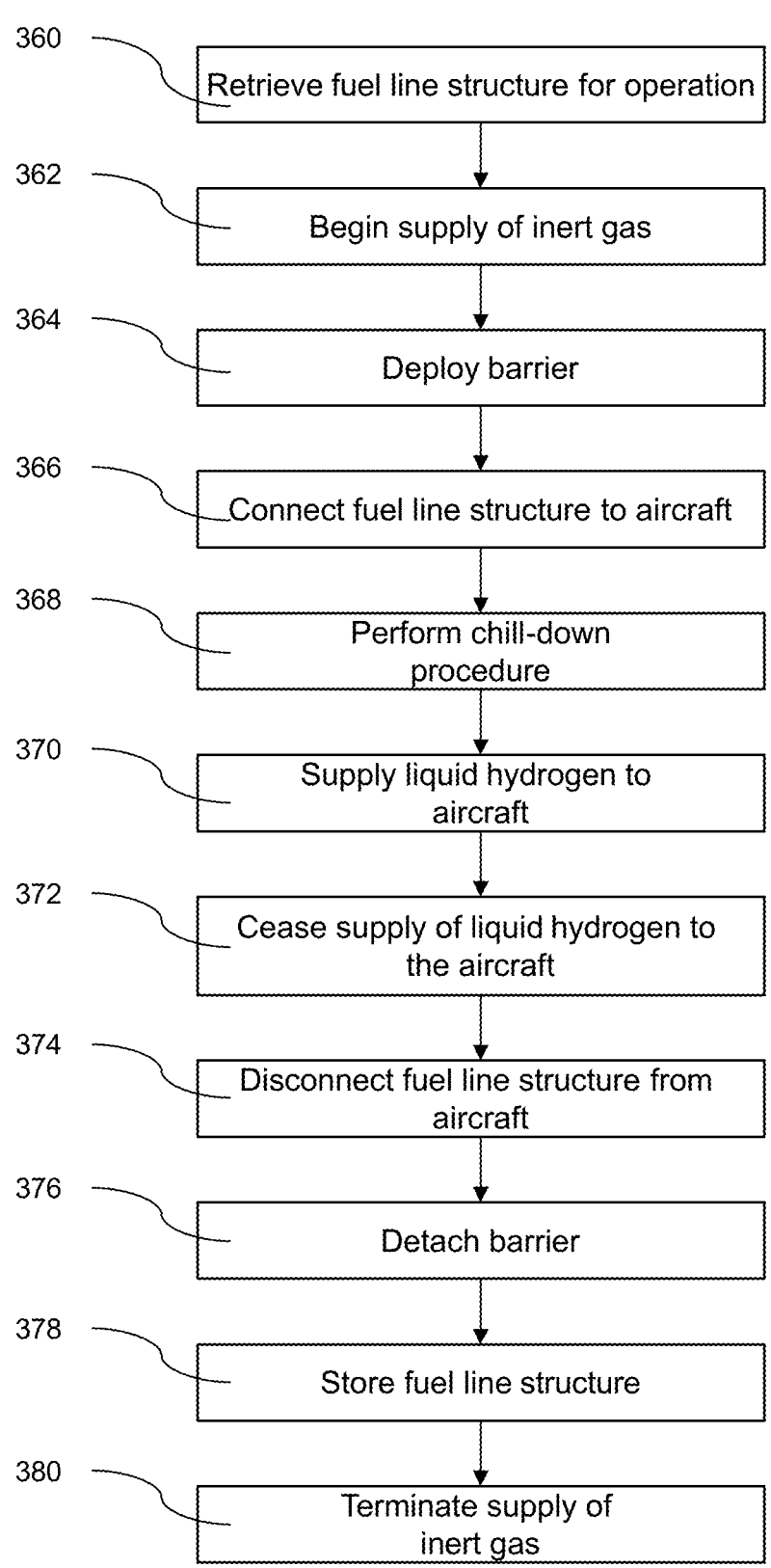
FIG. 7 shows a flow diagram illustrating a method of refuelling an aircraft with liquid hydrogen whilst reducing ignition risk using the present invention.

FIG. 7 shows a flow diagram illustrating a method according to a third embodiment of the present invention, which could utilize the apparatus of either of the first or second embodiments. The method is performed in respect of ground support equipment fueling of an aircraft on the ground. The method is performed for the purpose of refuelling an aircraft with liquid hydrogen whilst protecting against hydrogen ignition in the event of a hydrogen leak. The method includes a step of retrieving a fuel line structure 360 for operation. More specifically, this involves manually retrieving a refuel connector from ground support equipment. A further step is conducted in which gaseous nitrogen is supplied 362. The nitrogen is supplied at ambient temperature, and at a pressure less than 10 bar. The nitrogen is supplied to the region immediately around the refuel connector. The time difference between the step of retrieving the fuel line structure 360 and the step of supplying nitrogen is less than 2 seconds for example. However, in an alternative embodiment of the method, it may be that nitrogen must be supplied to the region immediately around the refuel connector before the refuel connector is retrieved for operation, for at least 2 seconds for example. The method further comprises the step of deploying a barrier 364. This barrier is disposed around the refuel connector. In this embodiment, this involves attaching a flexible material to a barrier support structure already present on the fuel line structure. In other embodiments the barrier may be provided permanently, or semi-permanently provided, on the refuel connector. The method further comprises a step of connecting the aforementioned fuel line structure to the aircraft 366 via the refuel connector. This refuel connector connects to a connection point, e.g., fuel port, on the aircraft. The connector is connected by pushing the refuel connector onto the corresponding connection point, and then rotating the refuel connector about its axis to lock it in place. A valve is then depressed to establish fluid communication between the refuel connector and aircraft fuel port, such that fluids can pass from one to the other. In other embodiments, the connection of the refuel connector to the aircraft may be performed differently without affecting the benefits of embodiments of the invention.

A further step of the method comprises performing a chill-down procedure 368 on the fuel line, before supplying the liquid hydrogen. This involves reducing the temperature of the fuel line, fuel tank, and any intermediate/ancillary components such that cryogenic fluid, in this case liquid hydrogen, can be passed through. This is performed in order to maintain a generally vapor-free liquid flow of liquid hydrogen, thus reducing the risks of spikes in pressure (due to the low boiling point of hydrogen relative to ambient temperatures). The method further comprises supplying liquid hydrogen fuel to the aircraft 370 through the fuel line. The liquid hydrogen is supplied at a temperature of 20K and a pressure greater than 1 bar. This step is performed until the aircraft tanks have the desired quantity of fuel for the specific situation. The method further comprises a step of ceasing the supply of liquid hydrogen to the aircraft 372. The method further comprises the step of disconnecting the fuel line structure from the aircraft 374. This step comprises the inverse of attaching the fuel line structure to the aircraft 366. The valve is lifted, terminating the fluid connection between the refuel connector and the fuel port. Then, the refuel connector is rotated about its longitudinal axis, in the opposite direction to the direction used for attaching, unlocking the refuel connector. Then, the refuel connector is pulled away from the connection point. The method further comprises a step of removing the barrier from the fuel line 376. This step involves detaching a flexible material from the barrier support structure. The method further comprises a step of storing the fuel line structure 378 in the ground support equipment. The method may further comprise a step of terminating the supply of inert gas 380 through the gas line. It may be that this step is performed automatically upon storing of the fuel line structure 378. For example, storing of the fuel line structure 378 may depress a switch which terminates the inert gas supply. It may be that the inert gas continues to be supplied for a period of time after the fuel line structure is stored, for example 2 seconds. It may instead be that the supply of inert gas is switched off manually directly before storing of the fuel line structure.

The illustrated embodiments described above thus enable a significant reduction in the risk of ignition of hydrogen when refuelling an aircraft with cryogenic hydrogen as a result of creating, with the use of an appropriately positioned veil or other barrier, a region that can be supplied with sufficient inert gas to create a volume of low flammability adjacent to the aircraft and in the vicinity of the refuelling equipment and of the manual operators handling such equipment.

While the present invention has been described and illustrated with reference to particular embodiments, it will be appreciated by those of ordinary skill in the art that the invention lends itself to many different variations not specifically illustrated herein. By way of example only, certain possible variations will now be described.

The fuel supplied to the aircraft may not be liquid hydrogen. This apparatus and method are suitable for preventing ignition of other flammable sources.

The barrier may be permanently fixed to the fuel line structure, for example the spokes and barrier support structure may be fixed to the fuel line and the barrier may be fixed to the barrier support structure with the use of adhesive or the like.

The spokes, barrier support structure and the barrier may be collapsible so that the barrier can be folded for storage, when not in use.

The illustrated embodiments have been described with reference to underwing refuelling. However, it may be that other refuelling locations exist on a hydrogen-fueled aircraft. Embodiments of the invention would be suitable for refuelling at these locations. It may further be that the surface of the barrier in contact with the aircraft is specifically shaped to complement the shape and curvature of the aircraft surface, resulting in an irregularly shaped barrier.

The barrier may not be circular in cross section along the axis parallel to the axis of the fuel line. It could, for example, be oval, triangular, or any other shape, regular or irregular, and the cross-section could vary in size along the axis.

FIGS. 3 to 6, display the gas line outlets being the same distance from the fuel line connector along an axis parallel to the axis of the fuel line. In other embodiments, different outlets may be at different distances in order to result in a different flow pattern of inert gas.

After the gas line furcates, each furcated gas line may furcate again. In some variations, some furcated lines may furcate whilst others do not. Some furcated gas lines may be larger and as a result supply more gas than other gas lines. This may result in a different flow pattern of inert gas. The configuration of the gas lines and outlets is not intended to be limiting.

It may be that the barrier is not open at both ends. It may be that the barrier is open at the end in contact with the aircraft but closed at the opposite end. In this embodiment, inert gas may be supplied to cause over-pressure in the region within the barrier. The seal between the barrier and aircraft might not need to be airtight and might permit gas present within the barrier to exit. It may also be that the surface in contact with the aircraft is closed, except for where the fuel line connector connects to the aircraft. The use of inert gas to prevent hydrogen ignition may thus be supplied to flood the region with inert gas while not attempting to seal the region off from atmospheric oxygen or be supplied to create overpressure in a protected region that seeks to seal the region off from atmospheric oxygen and not allow the ingress of atmospheric oxygen.

It may be that the embodiment as shown in FIG. 6 need not have a gas line that furcates. Instead the inert gas line may supply a manifold in the form of a compartment arranged circumferentially around the end of the refuel connector. This compartment could have multiple outlets arranged on its outer edge. The gas line would terminate inside this compartment so that inert gas would be fed into the compartment and subsequently exit through each outlet. Alternatively or additionally, the gas line may be fully integrated into the fuel line structure.

The barrier does not necessarily need to be cylindrical in shape. It may, for example, be in the shape of a dome, with the base of the dome being in contact with the seal which contacts the aircraft.

The inert gas could comprise $CO_2$ and/or argon (or other gases from group 18 of the periodic table), and possibly less or no Nitrogen. What is important is that the inert gas has a very low concentration of oxygen.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An ignition protection system for a ground-based refuelling/defuelling system for an aircraft, the refuelling/defuelling system comprising a fuel line terminating at a refuel connector, wherein the ignition protection system comprises:

a structure configured to provide a barrier around the refuel connector, and a gas line configured to supply inert gas into a volume between the barrier and the refuel connector, wherein the gas line has an outlet through which the inert gas is delivered to the volume between the barrier and the refuel connector, the outlet external to the refuel connector.

2. The ignition protection system according to claim 1, wherein the structure has a maximum dimension that is less than 100 cm and is integrated with, or configured to be integrated with, the refuel connector, or the fuel line, or both.

3. The ignition protection system according to claim 1, wherein the barrier encloses the refuel connector radially on all sides.

4. The ignition protection system according to claim 1, wherein the barrier has a first end and a second opposite end, the second end configured to be directly adjacent to an aircraft in use, and wherein at least one of the first end and the second end is open.

5. The ignition protection system of claim 4, wherein the second end of the barrier comprises a seal configured to seal a space between the barrier and an adjacent aircraft surface.

6. The ignition protection system according to claim 1, wherein the barrier is made from flexible material.

7. The ignition protection system according to claim 1, wherein the gas line is connected to a supply of inert gas located on a ground support equipment.

8. The ignition protection system of claim 1, wherein the gas line is in fluid communication with at least two gas line outlets.

9. A ground-based refuelling system for an aircraft, the system comprising;

a fuel line terminating in a refuel connector, and the ignition protection system according to claim 1.

10. The ground-based refuelling system of claim 9, wherein the gas line is integrated with a fuel line structure that also houses the fuel line.

11. The ground-based refuelling system of claim 9, wherein the fuel line is at least in part vacuum-insulated.

12. The ground-based refuelling system of claim 9, wherein the fuel line supplies liquid hydrogen.

13. A method of fuelling/defuelling an aircraft with liquid hydrogen, the method including the steps of:

supplying hydrogen to an aircraft via a fuel line connected to the aircraft at a connection at the aircraft, disposing a barrier around the connection, and supplying an inert gas into a region between the barrier and the connection to protect against ignition of hydrogen gas via a gas line having an outlet through which the inert gas is delivered to the region between the barrier and the refuel connector, the outlet external to the connection.

14. The method of claim 13, wherein the aircraft is on the ground.

15. The method of claim 13, further comprising:

a chill-down process on the fuel line.

16. The method of claim 13, wherein the step of supplying inert gas comprises automatically supplying inert gas before hydrogen is supplied.

17. A ground-based refuelling/defuelling system for a hydrogen powered aircraft, the ground-based refuelling/defuelling system comprising.

* * * * *